…

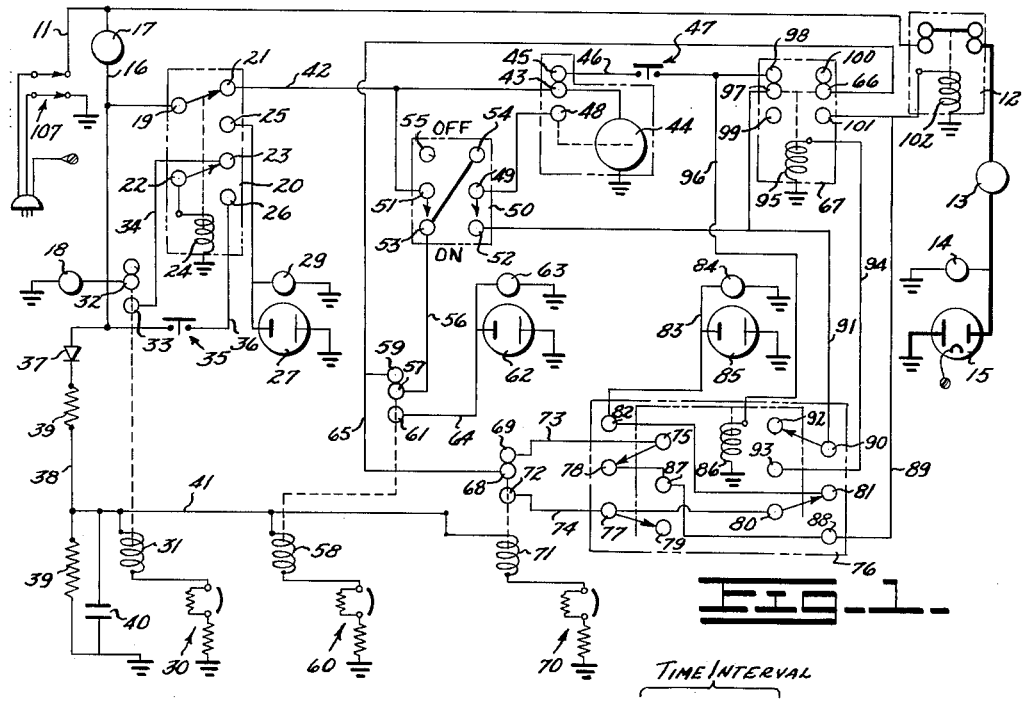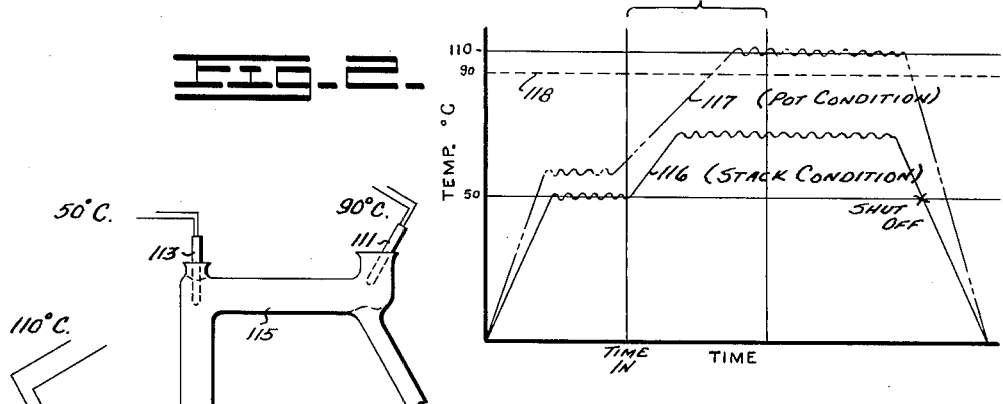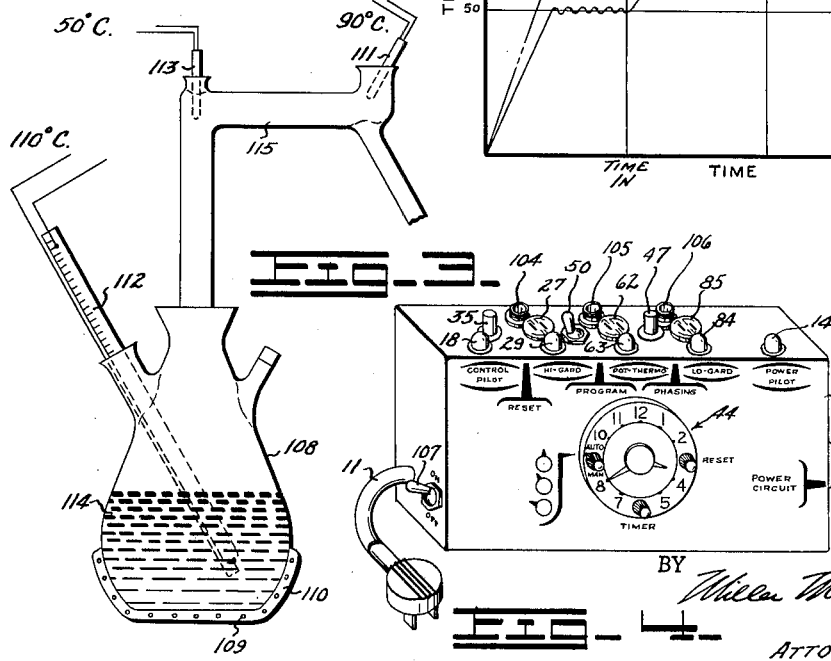

3,201,615
REACTION CONTROL DEVICE
William G. Jackson, North Muskegon, Mich., assignor to Burdick and Jackson Laboratories, Inc., Muskegon, Mich., a corporation of Michigan
Filed May 27, 1960, Ser. No. 32,342
3 Claims. (Cl. 307—116)

The present invention relates to a reaction control device and more particularly to an instrument capable of controlling a wide variety of physical and chemical processes by sensing and relaying sensed conditions of temperature, pressure, movement, volume and time, or combinations of these in an infinite variety of situations as encountered in laboratories.

Various devices have been devised for sensing, recording, and controlling individual of the control elements indicated above. Such instruments are accurate and individually they perform an excellent function. However, to date, the chemist and physicist has not been provided with a simple control appliance which can function as a coordinating control sensing structure making adjustments in flow or conditions in accord with a prearranged schedule. The development of such a device would have obvious time saving advantages and would provide a level of consistent accuracy unaffected by human error or frailty. No such device has been offered to the chemists and physicists and manpower is lost in watching or monitoring routine reactions and procedures.

The present device proposes to solve this problem by putting into the hands of the scientist a simple control instrument from which a wide variety of sensing and control functions may be performed, limited only by the ingenuity of laboratory personnel in applying selected programming to process control, reaction control, analysis, synthesis and like operations.

The advantages of such a device can be readily appreciated by any laboratory worker who can recall the many hours spent in simply watching a distillation or reflux operation through to completion with the knowledge that a failure to recognize critical conditions can cause serious damage imperiling life, equipment and material. Thus, the present device provides a means for safely monitoring and controlling chemical activity within pre-established safe operating limits. The device contemplates step and repeat operation control, time interval control, and in cooperation with suitable accessories, flow control, volumetric or weight sensing control, lineal control, maintenance of constant or variable pressures, and temperatures, with selected operating controls centering from a common sensing instrument.

Among the principal objects, therefore are the provision of a complex circuit into which may be inserted a variety of sensing leads, the circuits providing sequence control and superimposed limit controls and time controls.

Another object is the provision of a simple panel controlled instrument structure in avoidance of a maze of wiring and dubious connections from which simple manual operations establish appropriate circuit control without involved apparatus circuitry.

Still another object is to provide control structure amenable to inert gas encapsulation so as to make it available under otherwise unsafe conditions.

Still another object is to provide a simple economical control structure thereby eliminating lost laboratory time in adopting a desired circuit for control wiring.

Still another object is to provide electrical energization of outlet structures in accord with sensed critical conditions for operating any desired electrical, mechanical, or hydraulic equipment, such as valves, stirrers, motors, solenoids, cylinders, and the like.

The present device also includes among its objects the inversion of limit control thereby allowing a single control limit function in a reverse sense.

Other objects, including easy maintenance, compact availability, and simplicity will be readily apparent to those skilled in the art as the description proceeds.

In the drawings:

FIGURE 1 is a circuit diagram indicating the simplicity of the instant control device.

FIGURE 2 is a graphic representation of the function of the apparatus shown in FIGURE 1 in controlling a distillation operation as set forth in FIGURE 3.

FIGURE 3 is a side elevation view of a distillation set up indicating control thermometers which are contact led to the circuit structure as shown in FIGURE 1.

FIGURE 4 is a perspective view of the control device from the exterior of the encasement indicating the plug-in simplicity of its use.

GENERAL DESCRIPTION

In general, the instrument of the present invention comprises a plurality of receptacles for sensing leads. These receptacles are conveniently located in a common housing. The closing and opening of the lead circuits serves to energize and de-energize relays. The relays in turn, act upon selected circuits located within the housing. One of these circuits provides a maximum condition control, another circuit provides a minimum condition control, and a third circuit provides an intermediate condition control; each of these circuits, in combination with the others, provide a master control over a main power line. Interposed on these circuits is a timer control capable of starting and stopping a whole process to be controlled by the instrument or providing interval timing as desired in intermediate phases. Visible signals are provided for visually indicating the operative circuit conditions and outlets are energized and de-energized with the visible signals to provide power outlets available in each of the circuits in accord with each of their critical limits. These outlets may in turn serve to control valves, release mechanisms, and the like so as to provide auxiliary operations formerly done by hand upon the achievement of certain critical or set conditions. By this arrangement, and assuming the sensing leads to be connected to limit thermostatic regulators, not only does the instrument perform a thermostatic control, but as will be seen also achieves a reverse thermostatic effect. In the same sense that a thermal response is available in control over the sensing leads, so also limits of pressure, volume, weight, and movement may also provide the sensing limits for control by the instrument. Thus, the instrument achieves a full monitoring range capable of freeing laboratory people for service apart from routine monitoring. As will be seen, the instrument is capable of performing many manual functions related to the achievement of critical sensed points, such as measuring, drawing off, metering and dispensing as may be desired in a given preselection of process programmed on the instrument. As has been indicated, the factor of time is also provided for in the circuits as described. Aside from merely starting up or shutting down, the time factor may be inserted in the process as a control over any phase the start of which or the end of which has been sensed by the instrument. Further, the instrument provides a safety factor beyond the accuracy of an observer in shutting down a whole operation irrespective of sequence as a danger critical is reached. As will be seen and appreciated, the present instrument is also capable of inverting the limit function by allowing selected conditions to prevail in excess of a fixed condition setting, and then using the same condition as a limit when the exceeded fixed condition is restored.

Power line

The power line is of the grounded return type and broken by a normally open solenoid controlled switch. The power line is fused beyond the switch and a load pilot light is provided in the line. The outlet of the power line is a plug-in receptacle for leading out power to a line load, for example a heater.

The solenoid operated power relay provides stop and start control over the line load and can be closed only by energization from the control circuit.

Control circuit

The control circuits receive current from a fused lead off from the main power line which is indicated by a control pilot light. Thus, current for the control circuits operates the sensing elements, the relays, the visible circuit signals and the power for the control receptacles.

Maximum condition control

Maximum condition control is sensed by the maximum sensing element. When and if maximum set conditions are achieved, the solenoid in the maximum condition sensing line is energized thereby shifting the normally open switch in the maximum control circuit to close thereby energizing the solenoid element and shifting the associated latching relay to energize the maximum condition receptacle and deenergizing the control circuit to the timer and other circuits thereby opening the main power line. Thus, the maximum condition circuit achieves a complete shut off. The maximum condition circuit is reset by operation of the manual reset button or switch as will be later described.

Reset button

The function of the reset button is to accomplish reset of the Maximum Condition Circuit. As will be appreciated, the button, when pressed, energizes the solenoid shifting the relay so as to reactivate the Maximum Condition Cycle and re-energize the main power line.

Minimum condition inversion circuit

The minimum condition circuit is also provided with a conditioning probe, as for example a thermostat. In usual thermostat operation, for example, when the set point is achieved an alarm or control circuit is energized, the main power circuit is de-energized and the minimum condition circuit is used in its thermostat sense. As will be appreciated, as by starting beyond the set condition the minimum condition circuit can function as a reverse thermostat depending upon the function desired. However, with selected use in connection with a timer element this circuit may be inverted as to function allowing the set point to be exceeded and thereafter inverting the thermostatic function thereby selectively energizing or de-energizing a control circuit as desired during process control. This circuit, as will be seen is best controlled by a plural pole coil relay.

Intermediate control circuit

The intermediate condition or control circuit is also provided with a condition sensing probe. When the condition set on the probe is achieved the power line flow is interrupted and the intermediate receptacle and signal are energized until conditions drop below the indicated set point when power is restored to the power line and the intermediate receptacle and signal are de-energized.

Timer and programming switch

The timer is electric and of the clock type. Together with the programming switch and the phasing relay, it provides means for time control over the monitored processes, but also provides a time delay allowing the monitored condition on a selected control circuit to be assuredly exceeded and accomplishing the inverting of the function of the probe inserted in the selected control circuit. The is accomplished in such a manner as not to interfere with the other control circuits.

SPECIFIC DESCRIPTION

Referring particularly to FIGURE 1 power line 11 is illustrated and is opened and closed by normally open solenoid operated relay 12 shown in closed position. The power line 11 is provided with a suitable line fuse 13 and pilot light 14 and then feeds to the work receptacle 15. As will be appreciated from the FIGURE 1 a ground return system is employed. The control over the power line 11 is wholly supplied by the fused monitoring control circuits off of the power line 11 acting upon the relay 12. The control lead 16 branching from the power line 11 is provided with a fuse 17 and is provided with the pilot light indicator 18. The line 16 thus serves to constantly energize the pole 19 of the relay 20, normally closing on the post 21. The pole 22 of relay 20 is shown closed upon the post 23. The pole 22 is connected to the solenoid 24 of the latching relay 20. Upon energization of the solenoid 24 the circuit to posts 21 and 23 are opened and the relay then closes the poles 19 and 22, respectively on posts 25 and 26, respectively, thereby accomplishing a complete disconnect of all other control circuits and an opening of the power line 11 at the relay 12. When such a shift occurs, the maximum condition receptacle 27 is energized by line 28 and the maximum condition signal light 29 is lit. The shift occurs when the set condition on the Maximum Condition probe element 30 is achieved thereby energizing the solenoid 31 moving the relay pole 32 into contact with post 33 thereby energizing lead 34 to pole 22 via post 23 and causing the energization of the solenoid 24 in the relay 20. Reset of the maximum condition control is accomplished by manual actuation of the momentary contact reset button 35 inserted in the line 36 connected to the contact 26. As will be appreciated from the FIGURE 1, a rectifier is inserted in the lead 38 along with suitable balancing resistances 39 and capacitance 40 feeding to the line 41 energizing the probe elements as, for example, the maximum condition probe element 30. Conversion of the probe feed lines to D.C. current is desirable in allowing maximum probe sensitivity and avoids chance arcing. The function of the maximum condition circuit just described is to provide a complete disconnect of the control device upon achievement of any dangerous condition. The system may thereafter be restored to function when the maximum danger condition is averted. It will be appreciated that a plurality of probe elements may be substituted for the probe 30, all in parallel. Any exceeding of the set point on any one of such probes would cause disconnect of line power.

Until and unless maximum conditions occur, it will be seen that the pilot control is through line 16 to line 42. The line 42 feeds to the timer clock circuit through clock pole 43. The pole 43 leads to the motor of clock timer 44 and except during a timed interval the pole 43 is in contact with the contact 45 in line 46. The line 46 is closed momentarily by holding down the phasing button or switch 47. As will be appreciated, when the timer 44 achieves its set condition at the start of a timed interval the pole 43 is shifted out of contact with contact 45 and into contact with contact 48 and thence to the pole 49 of program switch 50. Pole 43 returns to post 45 upon expiration of a timed interval. The pole 51 of program switch 50 is directly led from the line 42. As indicated in FIGURE 1, the program switch 50 is in the "ON" position with the poles 49 and 51 in contact with posts 52 and 53 respectively. When the program switch 50 is "OFF" the poles 49 and 51 are in contact with the posts 54 and 55, respectively. The lead 56 from post 53 is to the intermediate pole 57 acted upon by the solenoid 58. Normally, the pole 57 is closed against the contact 59, but when the solenoid 58 is energized by achievement of set conditions in the probe 60, the pole 57 moves to close on contact 61, thereby energizing the intermediate receptacle 62 and intermediate signal light 63 on line 64 and de-energizing main line power. Line 65 leads from the contact 59 and is connected at one end to pole 66 of solenoid operated relay 67 and at the other end to pole 68 of the minimum condition circuit entry. The pole 68 is normally in contact with post 69 of the minimum condition entry circuit, but upon achievement of the set condition in minimum condition probe 70, the solenoid 71 shifts the position of pole 68 into electrical contact with post 72 thereby shifting the direction of current flow through the minimum condition circuit, as will be seen, from line 73 to line 74. The line 73 is in contact with pole 75 of the plural pole solenoid operated minimum condition latching relay 76. The line 74 is in contact with pole 77 of the relay 76. When relay 76 is phased as shown in FIGURE 1, the pole 75 contacts post 78 and pole 77 is in contact with dead post 79 but is in constant bridging contact with pole 80. Pole 80 is shown in contact with post 81 and post 81 is in turn in contact relationship with post 82 on line 83, the latter line 83 leading to the minimum condition signal light 84 and minimum condition receptacle 85. The relay 76 is operated or rephased by energization of the solenoid 86 which shifts the contacts so that pole 77 is placed into flow contact with post 87, pole 75 is placed in flow contact with post 82, and pole 80 is shifted to contact post 88 thereby connecting to line 89. Pole 90 on the terminal end of line 91 is shifted from dead contact 92 to current passing contact with post 93 energizing line 94 and thence permitting energization of the solenoid 95 of the relay 67 (provided line 91 is energized).

The minimum condition relay 76 is energized by line 96 from line 46 when the manual actuation of the phasing button 47 closes the break in line 46 or when timer contact 43 is closed on the contact 48, as will be seen. When pole 90 closes on contact 93 with energization of the solenoid 86 in the relay 76, then the solenoid in the relay 67 is energized disconnecting pole 97 from out of engagement with terminal 98 on line 46 and engages dead terminal 99. Simultaneously pole 66 is withdrawn from contact with dead terminal 100 and engages terminal 101 closing line 65 on line 89 serving the solenoid 102 operating power line relay 12. Energization of the line 89 closes the power line 11 and thereby lights the power pilot 14 and energizes the power outlet receptacle 15.

As will be noted, the minimum condition circuit serves a perfectly normal unchanging limit function or an unchanging reverse limit function when the program switch 50 is in the "OFF" position, the clock timer 44 simply serving as an interval timer. In the "ON" position, however, the program switch 50 arms the minimum condition circuit served by limit probe 70 for inversion of the limit function when the time-in-point set on the clock 44 and the time interval thereafter assure that the set point on probe 70 is exceeded. Then the set point on probe 70 interrupts the power circuit only when the condition drops to the set point. Previous to time-in point, it will be appreciated that the probe 70 functions upon increase of condition to reach the set point. Expressed for example as a "thermostat" function, the probe in this use simply signals or monitors a rise in temperature to a shut off of line power at the set point. The apparatus described provides a time delay disarming the set point so that the condition monitored is exceeded during process operation. Thereafter, the control circuit is still actuated by the set point, and the power circuit is still subject to being deactivated, but now only upon conditions dropping to the set point.

It will be appreciated that with program switch 50 "OFF" there is main line power only during the timed interval and then only when the various control circuits are properly conditioned by their respective probes. With program switch "ON" the main line 11 is energized whenever control circuits are satisfied and the function of the timed interval is to accomplish inversion of function of the minimum control circuit. With program switch 50 "ON" the timed interval causes pole 66 to be held in contact with post 101 thereby achieving an effective bypass of the minimum condition circuit while the set-point on the minimum condition probe 70 is exceeded. The timed interval is selected to accomplish this excess. Thereafter the function of the probe 70 is restored but reversed.

Thus, at the termination of a timed interval the probe 70 then functions as a reverse thermostat or condition monitor. This sequence of control with automatic inversion requires that before the time-in-point of clock 44 relay 76 is phased as shown in FIGURE 1. The relay 76 may be so phased or oppositely phased at any time, except during a timed interval, by manual operation of the phasing button 47. The controls and relays for integration of these functions are contained in a housing 103 as shown in FIGURE 4. All control indicia are readily visible and bear corresponding reference numerals as expressed in the schematic wiring diagram of FIGURE 1. With the enclosure 103 it is quite a simple matter to fully encapsulate the electrical components in an atmosphere of inert gas during use where chance arcing might create ignition of explosion. The power outlet 15 provides a simple connection to a heater or other work element not shown. The maximum condition receptacle 27 and signal 29 with its socket for probe 30 is grouped at one end of the case 103. The intermediate condition receptacle 62 and visible signal 63 is positioned centrally. The minimum condition receptacle 85 and visible signal 84 are positioned opposite the maximum condition receptacle 27 and signal 29. The phasing button 47 is located intermediate the minimum and intermediate condition circuits. The programming switch 50 is located between the maximum and intermediate circuits. The timer 44 is located in the face of the housing 103 where it is easily read and set. Probe sockets 104 (Maximum Condition) 105 (Intermediate Condition) and 106 (Minimum Condition) are provided adjacent their respective signals and receptacles. The probes 30, 60 and 70, respectively are insertable in the sockets 104, 105 and 106 and are shown in FIGURE 1. The main power line 11 is illustrated as extending from the housing 103 on one side and lead out receptacle 15 is provided through the other side of the housing 103. A toggle switch 107 is provided on the input line and positioned on the side of the case 103.

As will be appreciated, each of the receptacles 27, 62, and 85 are energized by the set points established by the respective probe elements 30, 60 and 70. The achievement of the set points also provides control over the main power line 11 so that de-energization of receptacle 15 always accompanies energization of receptacle 27, 62 or 85. The timer 44 provides a master control over the main line 11 where desired, and provides, in association with the programming switch 50, an inversion function for at least one of the probe circuits. This is illustrated here as a function imposed upon the minimum condition circuit. This provides full range monitoring for a wide variety of scientific and production control processes and is particularly useful in chemical laboratories where repetitious and time consuming monitored cycling is required.

FIGURE 3 illustrates a characteristic usage of the described control apparatus. A flask 108 is shown heated by a coil 109 contained in the heater jacket element 110. The coil 109 is connected to the main line 11 of the described apparatus by simply plugging the heater coil 109 into the receptacle 15. Thermometer elements 111, 112 and 113 are strategically located in respect to the flask 108. In the illustrated example, a fluid 114 to be distilled for example a mixture of alcohol and water is shown in the flask 108. The intermediate thermometer element 112 (corresponding to probe 60 in FIGURE 1) is inserted in the liquid or fluid 114. The set point on the thermometer element 112 is established at 110 degrees centigrade. A similar thermometer element 111 is inserted selectively in the stack line 115 as shown. This corresponds to the maximum condition probe 30 and is set at 90 degrees centigrade. The thermometer element 113 is also set in the stack line 115 as shown with a set point at 50 degrees centigrade. This element 113 corresponds to the minimum condition probe 70 shown in FIGURE 1. These thermo-probe elements are plugged into their corresponding positions in the described apparatus and it will be appreciated that in their normal function the line current supplying the heater 110 will automatically stop upon the achievement of any of the established set points. The circuit 11 is closed by energization of the control apparatus and with all of the elements 111, 112 and 113 below their set points. This can be accomplished by setting appropriate time-in and time-out points on the clock timer 44 and with the program switch 50 in the "ON" position and with relay 76 phased as shown in FIGURE 1. Then upon attainment of the time-in point probe element 113 will have its function inverted, i.e. will operate as a reverse thermostat but will first be by-passed during the timed interval which is suitably long to assure that the set point of probe 113 is exceeded. In the illustration this occurs in reference to thermal probe 113 having a set point at 50 degrees centigrade. The intermediate probe 112 always serves a thermostat function shutting off line power to the heater 110 upon achievement of the 110 degree centigrade set point in the liquid 114. Thermal probe 111 (Maximum Condition) will override all other circuits if the set point of 90 degrees centigrade is achieved. This is a safety valve type unit. The probe 113 will similarly serve as a thermostat until the "time-in" point on the clock 44. Then the effect of the circuit from 113 (minimum condition) is suspended for the time interval allowing a condition to prevail in the stack 115 at the position of probe 113 in excess of 50 degrees centigrade. When the time interval is complete then the minimum condition probe 113 will cause disconnect of power to 109 only when the thermal conditions at the position of probe 113 drop to the set point.

This is graphically portrayed in the FIGURE 2 in the illustrative system just described. Time is plotted against temperature. The control is started and temperature rises to the set point of 113. There the condition will hover, both probes 113 and 112 serving as thermostats. Clock time-in occurs and for the selected time-interval the set condition of 113 is allowed to be exceeded. Then the thermal condition at point 113 is controlled by the thermostatic action of probe 112 intermittently feeding power to the heater and shutting it off as its set point is reached. Thus, operating conditions in the line 115 are maintained at more than 50 degrees centigrade at probe 113 but less than 90 degrees centigrade at probe 111 until insufficient vapor reaches probe 113 and its temperature drops to 50 degrees. Thereupon, the whole operation is automatically stopped. If vapor conditions exceed 90 degrees as set at probe 111 all operation ceases by breaking the power line 11 and manual attention would be necessary to restore the control function.

The curve 116 shows the minimum condition monitoring at probe 113 as affected by the described apparatus and through and beyond the time interval.

The curve 117 shows the conditions prevailing in the same period at intermediate probe 112 and reflecting pot conditions. The dotted line 118 is the fixed thermal shut off established by probe 111 as a safety check and indicates a condition possibly never achieved in the stack 115.

Upon achievement of any set point the corresponding signal light is energized along with the corresponding power receptacle. As will be appreciated, audible signals may be inserted in these outlets or power is available for manipulative operations as selected. These might include stirrers, valves, or motors wherein energization is electrical. The illustration using thermometers as the probe elements 30, 60 and 70 was merely illustrative, their functions being clearest from a point of view of explanation. It will be appreciated that limit switches, floats, monometers and other limit probes closing upon a specific set or limit point may find use together or in combination with each other.

In this same regard, the probe elements 30, 60 and 70 might be so arranged as to cause relay actuation as indicated in FIGURE 1 in other ways than through solenoids, as for example the insertion of a thyratron tube or using other well known mechanical or electrical linkages.

As has been indicated, any number of sensing elements or probes serving a single control circuit may be used in parallel, and the attainment of any set point will actuate the control circuit so served. In this manner, for example, second and third probes in parallel might be used to monitor cooling water in the condenser and liquid (distillate) level in the receiver.

While other forms of function inverters may be employed, it is the intention of the present invention to include inversion control within the scope of the hereinafter appended claims. In usage, the device herein described has found ready acceptance and is applicable to a wide variety of chemical and process situations with attendant savings in man hours.

Having thus described the invention, other modifications and improvements will occur to those skilled in the art upon a thorough review of the present specification and drawing and such improvements and modifications are intended to be included herein limited only by the scope of the hereinafter appended claims.

I claim:

1. A monitoring and regulating device comprising: a plurality of sensing leads; a circuit connected to each of said leads through relay connections; a power outlet serving selectively as an audible signal, visual signal or work outlet energized and deenergized by each of said circuits in accord with the opening or closing of said leads; and a timer circuit providing selected interval on or off control over said circuits and superimposed on at least one of said circuits to override set conditions in one of said sensing leads thereby inverting the control function of said one of said sensing leads.

2. In a control instrument: a work circuit; relay means controlling said work circuit; a control circuit for activating said relay; and a clock means for reversing the phase relationship existing between said control circuit and said relay at a preset time.

3. In a control instrument: a work circuit; an alarm circuit; relay means adapted to alternately actuate said work circuit and said alarm circuit; a control circuit associated with said relay means; clock means for reversing the phase relationship between said control circuit and said alarm circuit and for interrupting the control of said work circuit by said relay means, and at a second preset time reestablishing said control in a reversed phase.

References Cited by the Examiner

UNITED STATES PATENTS

| | | | |
|---|---|---|---|
| 2,576,903 | 11/51 | Imm | 307—112 |
| 2,679,602 | 5/54 | Gallagher | 307—116 X |
| 2,764,702 | 9/56 | Miller | 307—116 X |
| 2,887,677 | 5/59 | Arrasmith | 340—213 |
| 2,898,483 | 8/59 | Muller | 317—137 |
| 2,949,273 | 8/60 | Roper et al. | 307—149 X |

LLOYD McCOLLUM, *Primary Examiner.*

MILTON O. HIRSHFIELD, *Examiner.*